United States Patent
Hingole

(10) Patent No.: US 8,487,741 B1
(45) Date of Patent: *Jul. 16, 2013

(54) SYSTEM AND METHOD FOR TOUCHSCREEN COMBINATION LOCK

(75) Inventor: Shailesh J. Hingole, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,494

(22) Filed: Mar. 5, 2012

Related U.S. Application Data

(63) Continuation of application No. 12/359,062, filed on Jan. 23, 2009, now Pat. No. 8,130,075.

(51) Int. Cl.
*G05B 19/00* (2006.01)
*G05B 23/00* (2006.01)
*H04B 7/00* (2006.01)

(52) U.S. Cl.
USPC ....... 340/5.55; 340/5.73; 70/278.4; 70/278.5; 341/35; 341/192

(58) Field of Classification Search
USPC ....... 340/5.55, 5.73; 70/278.4, 278.5; 341/35, 341/192
See application file for complete search history.

(56) References Cited

U.S. PATENT DOCUMENTS

| | | | |
|---|---|---|---|
| 1,503,807 A | | 8/1924 | Saunders et al. |
| 4,520,641 A | * | 6/1985 | Bako .............................. 70/312 |
| 5,017,851 A | * | 5/1991 | Heinzman ..................... 318/685 |
| 6,209,102 B1 | | 3/2001 | Hoover |
| 6,326,978 B1 | * | 12/2001 | Robbins ........................ 345/654 |
| 7,932,810 B2 | | 4/2011 | Gartner |
| 2005/0060554 A1 | | 3/2005 | O'Donoghue |
| 2005/0223342 A1 | * | 10/2005 | Repka et al. .................. 715/851 |
| 2006/0066580 A1 | | 3/2006 | Hsu |
| 2006/0156249 A1 | * | 7/2006 | Blythe et al. .................. 715/781 |
| 2007/0030963 A1 | | 2/2007 | Wyld et al. |
| 2007/0085759 A1 | * | 4/2007 | Lee et al. ........................ 345/1.1 |
| 2007/0266428 A1 | | 11/2007 | Downes et al. |
| 2009/0135142 A1 | | 5/2009 | Fu et al. |
| 2010/0042954 A1 | | 2/2010 | Rosenblatt et al. |
| 2010/0097322 A1 | * | 4/2010 | Hu et al. ....................... 345/173 |

* cited by examiner

*Primary Examiner* — Jennifer Mehmood
*Assistant Examiner* — Andrew Bee
(74) *Attorney, Agent, or Firm* — Vista IP Law Group LLP

(57) ABSTRACT

Systems and methods for touchscreen security gateways are described, wherein a mechanical lock simulation is presented and operated by the user of a touchscreen interface. Comparisons between entered and stored combinations may be processed and/or stored utilizing local or remote processing and/or storage resources. The mechanical lock aspect of the user interface may comprise simulated rotating elements that may be operated by user-induced sliding interactions upon the user interface. Several aspects of the mechanical lock simulation may be customized or programmed by the user, and the presentation of the user interface operation to the user may include audible and/or haptic feedback.

25 Claims, 19 Drawing Sheets

SYSTEM AND METHOD FOR TOUCHSCREEN COMBINATION LOCK

CROSS-REFERENCE TO RELATED APPLICATION

This application is a continuation of co-pending U.S. application Ser. No. 12/359,062, filed Jan. 23, 2009, the contents of which are incorporated herein by reference.

BACKGROUND

As platforms for accessing and utilizing secure data have become more distributed, there has been an associated evolution in secure gateway technologies. For example, in the era of early-generation terminal/server systems, terminal operators were conditionally allowed access to data through the employment of simple password gateways, operated using terminal keyboards and conventional computer terminal monitors. The gateways were relatively simple, as was the uniformity of user interface scenarios. With the ubiquity of a myriad of wireless networks and handheld computing devices, users are now attempting to access secure information through gateways all over the world, from platforms such as handheld PDAs and cellphones, along with more conventional devices, such as desktop personal computers. Many systems with graphical user interfaces now feature touchscreens, which are configured to receive inputs associated with a user's physical contact with such interface, and these touchscreens may be configured to behave as part of a gateway security chain. For example, referring to FIG. 1, a PDA (10) is depicted having a touchscreen interface (12) that is configured to present to a user a simple alphanumeric (14) security gateway. In the depicted case, the user may use his finger or other pointing instrument to enter a series of numbers with the touchscreen (they may, for example, be displayed as a series in the feedback field 16), followed by an election to process the entered series for access to data past the security gateway, by pressing a simulated "enter" button (18) on the touchscreen interface.

One of the challenges with such an interface is that it may not be optimized for ergonomic/user scenarios wherein a user is being interrupted, perhaps by other applications on the same device (e.g., by a phone call on the same PDA device), or wherein the user has limited ability to hold the device and/or accomplish certain fine motor skills, such as selecting simulated pushkeys (14) on a touchscreen (12), as required by the variation illustrated in FIG. 1.

Referring to FIG. 2A, an example of a device (10) having a touchscreen (12) presentation optimized for single-hand usage in switching visually-presented pages is depicted, wherein the device may be cradled by the four fingers (24) and selections to page forward or backward made with the thumb (22) of the same hand (20). As shown in FIGS. 2B and 2C, similar touchscreen devices may also be operated in other positions using the index finger (26) or a probe or instrument (28) as a pointer. Indeed, touchscreens are now featured on not only portable devices, such as the PDAs and cellphones depicted in FIGS. 1-2C, the car audio system (30) depicted in FIG. 3A, and the portable GPS navigation device (32) depicted in FIG. 3B, but also as gateways for accessing and controlling less portable systems, such as the copy machine (34) depicted in FIG. 3C. Notwithstanding the foregoing touchscreen user interface integrations into such systems, however, there continues to be a need for a further-optimized touchscreen-based security gateways that provide efficient, reliable utility to users in various operating scenarios such as single-hand operation and multitasking.

SUMMARY OF THE INVENTION

One embodiment is directed to a data security gateway system, having a user interface with a touchscreen, a processor, and a storage device. The processor is configured to display a mechanical combination lock simulation having one or more simulated rotating elements upon the user interface which may be operated by a user of the touchscreen to enter a gateway combination. The processor executes a comparison of the entered gateway combination with at least one value stored on the storage device to determine whether access to further information beyond the gateway shall be granted.

In one embodiment, the one or more simulated rotating elements may be operated by a sliding interaction upon the touchscreen adjacent a depiction of the one or more simulated rotating elements. The simulated rotating elements may be operated by touchscreen-induced rotation relative to a coordinate system of the mechanical combination lock simulation configured to remain substantially fixed during rotation of the simulated rotating elements. In one embodiment, the rotation of the one or more simulated rotating elements may be in a plane substantially parallel to that of the touchscreen, as in an embodiment comprising a concentric ring combination lock simulation, while in another embodiment, the rotation of the one or more simulated rotating elements may be in a plane substantially perpendicular to that of the touchscreen, as in an embodiment comprising a barrel combination lock simulation.

In one embodiment, the user interface and processor may be housed in a handheld device which may be configured to provide audible and/or haptic feedback to the operator, in various embodiments.

In various embodiments, the mechanical lock interface may be programmable to allow the operator to select, for example, what items different positions of the rotatable elements shall display, how many rotatable elements shall be employed, how many positions shall comprise the rotatable elements, and what the passkey combination shall comprise.

In one embodiment, a selection alignment indicator may be utilized to read a selected position of a displayed simulated rotating element. In other embodiments, the user interface and processor are configured to read a selected position as that which is aligned most closely with the center of the displayed simulated rotating element, or that which is aligned most closely with the plane of the touchscreen.

In another embodiment, the storage device is located remotely from the processor and user interface, and the processor executes the comparison locally. In an alternative embodiment, the storage device is located at a remote location from the processor and user interface, and the processor executes the comparison by transmitting the entered gateway combination to a second processor having direct access to the storage device.

A further embodiment comprises a method for providing conditional access to remotely-located secure data, wherein a gateway combination is captured utilizing a touchscreen user interface configured to display a mechanical combination lock simulation, and wherein the gateway combination is compared with at least one value stored upon a storage device, to determine whether access to further information shall be granted or not. The capturing step may be conducted by presenting one or more simulated rotating elements that are operated by a sliding interaction upon the touchscreen adjacent a depiction upon the touchscreen of the one or more simulated rotating elements. Operation of the one or more simulated rotating elements may comprise inducing a simulated rotation of said one or more simulated rotating elements relative to a coordinate system of the mechanical combination lock simulation configured to remain substantially fixed during such simulated rotation. In one embodiment, inducing a simulated rotation of said one or more simulated rotating elements may comprise rotating a simulated rotating element in a plane substantially parallel to the touchscreen plane, while in another embodiment, such rotation may be in a plane substantially perpendicular to the touchscreen plane. Audible and/or haptic may be provided to the user in various embodiments of the inventive method.

In various embodiments, capturing may be resolved using a selection alignment indicator, by determining which position is most close to the center of a given displayed rotating element, or by determining which position is most coplanar with the touchscreen. In one embodiment, comparison processing is executed locally, while in another embodiment, comparison is executed remotely.

In various method embodiments, the mechanical lock interface may be programmable to allow the operator to select, for example, what items different positions of the rotatable elements shall display, how many rotatable elements shall be employed, how many positions shall comprise the rotatable elements, and what the passkey combination shall comprise.

DETAILED DESCRIPTION

Figure 1:
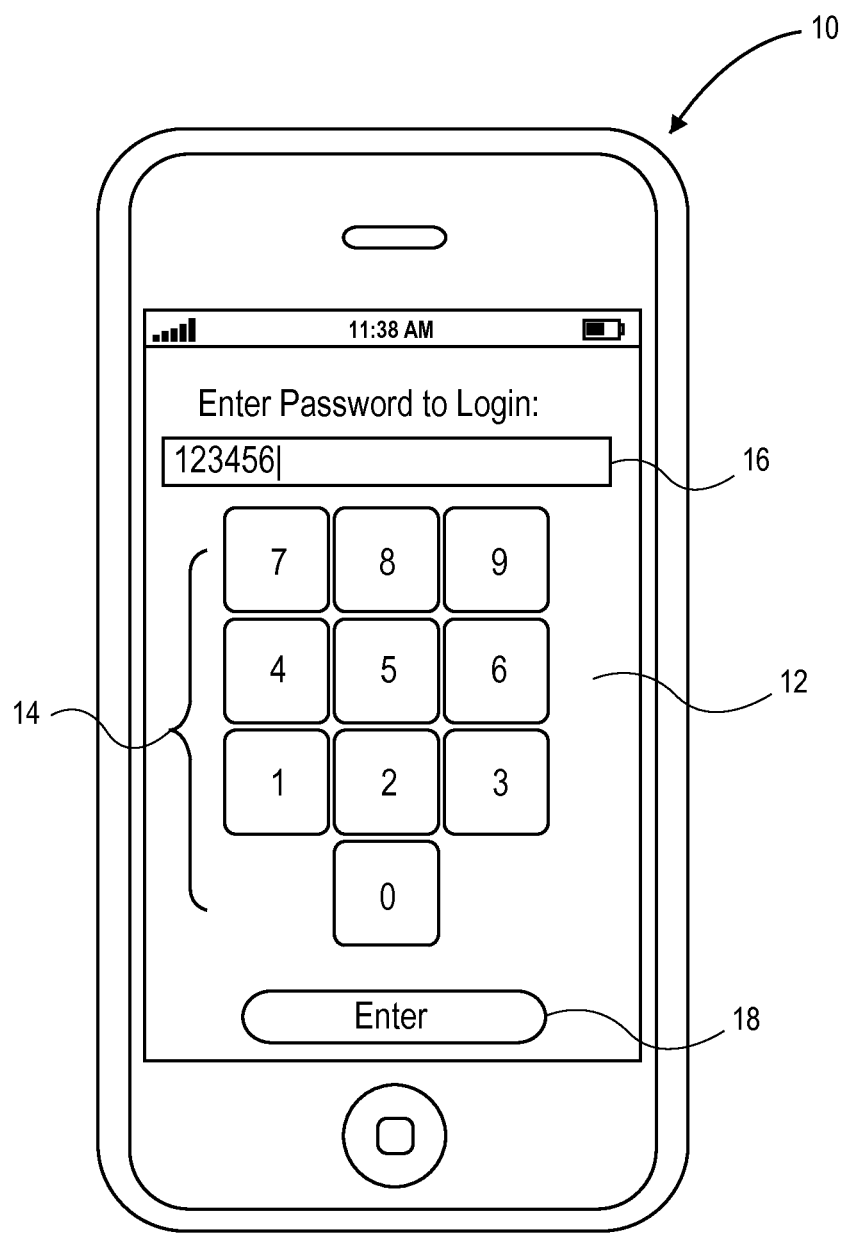
FIG. 1 illustrates an example of a conventional touchscreen-based security gateway implemented on a PDA.
Figure 2A:
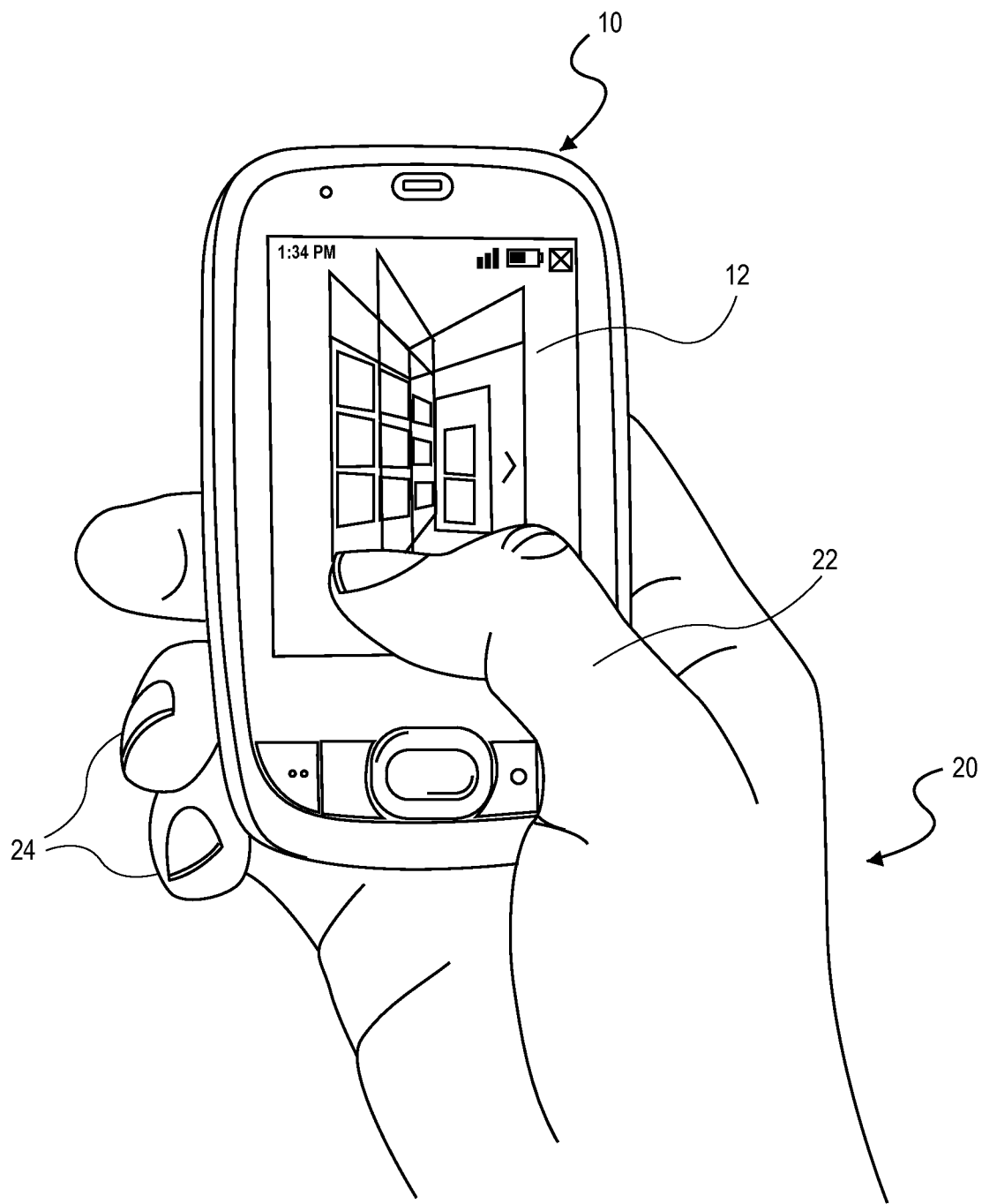
FIG. 2A illustrates a device having a touchscreen implementation configured to allow for single-handed page switching.
Figure 2B:
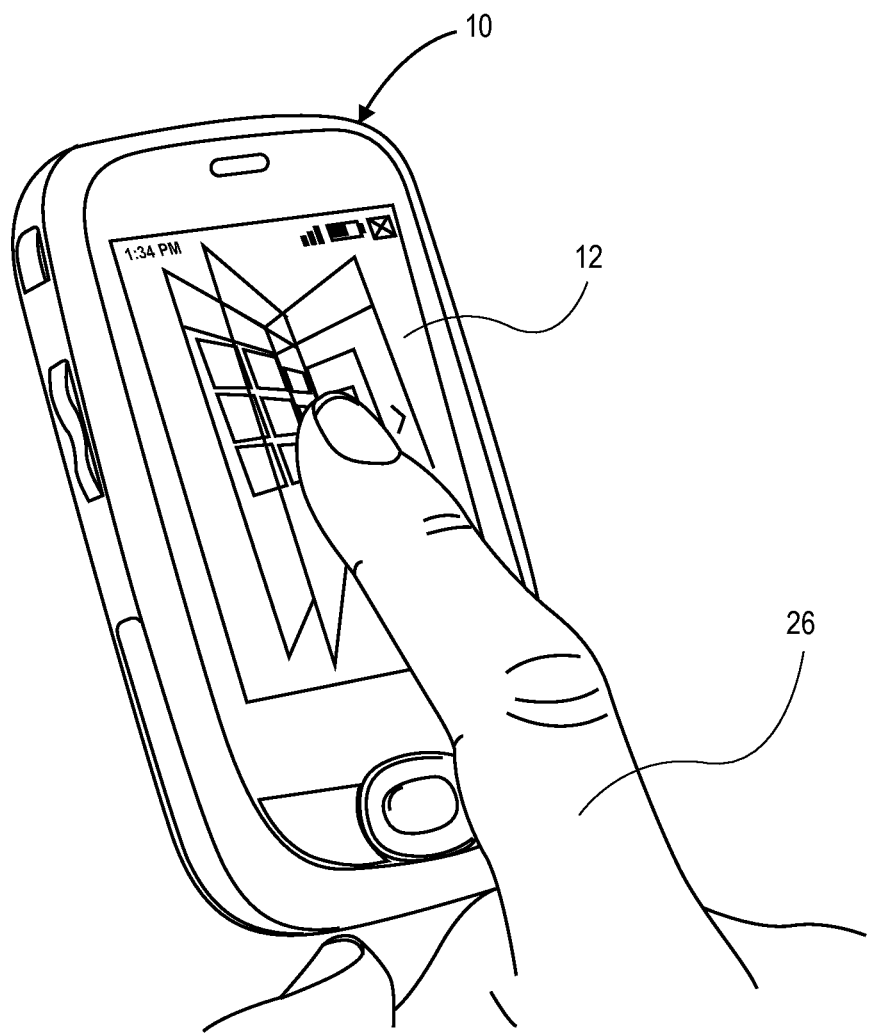
FIG. 2B illustrates a device similar to that depicted in FIG. 2A being operated with the index finger as it is supported by structures other than simply the depicted hand of the operator.
Figure 2C:
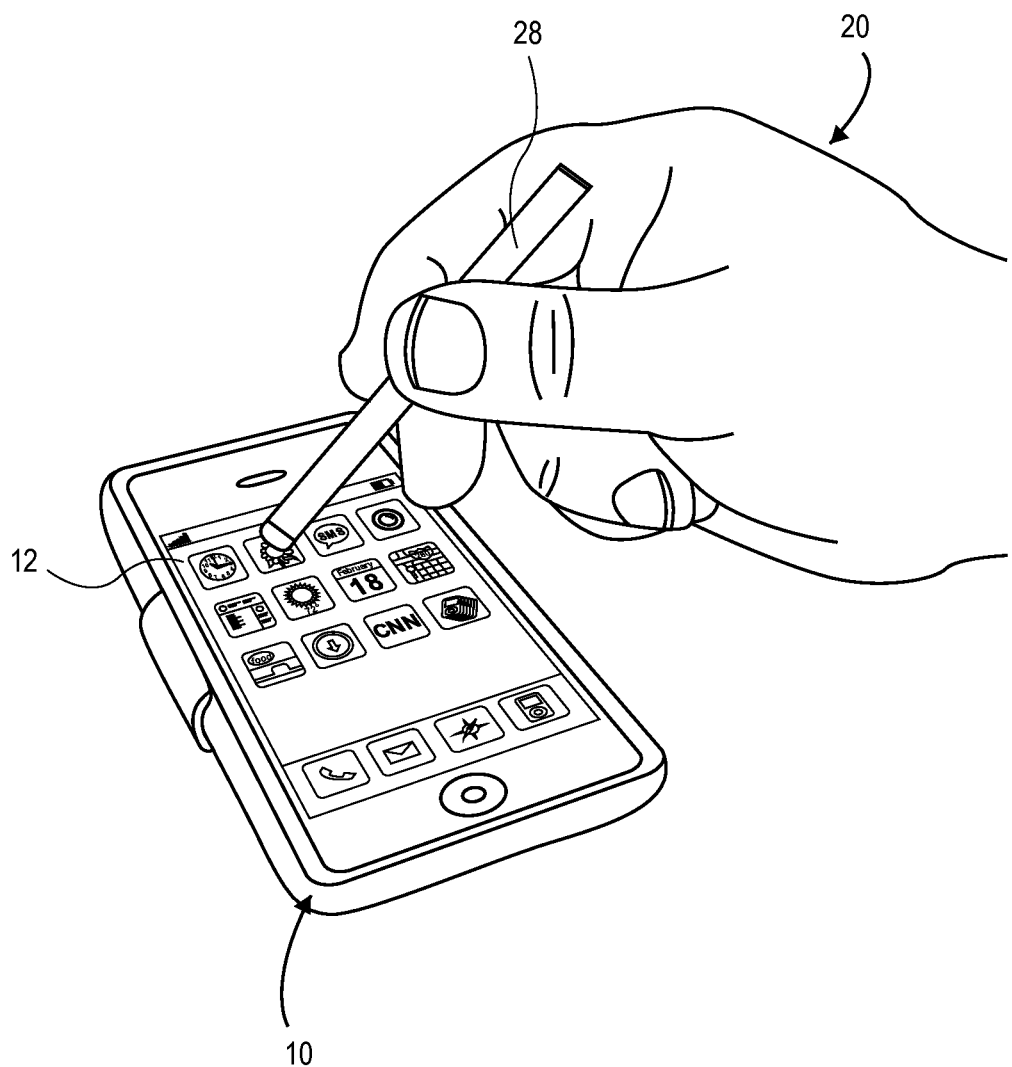
FIG. 2C illustrates a scenario similar to that depicted in FIG. 2B, wherein the depicted device is supported by one or more structures (such as a tabletop) other than the depicted operator hand, and wherein the operator is engaging the touchscreen with a pointing instrument rather than his hand.
Figure 3A:
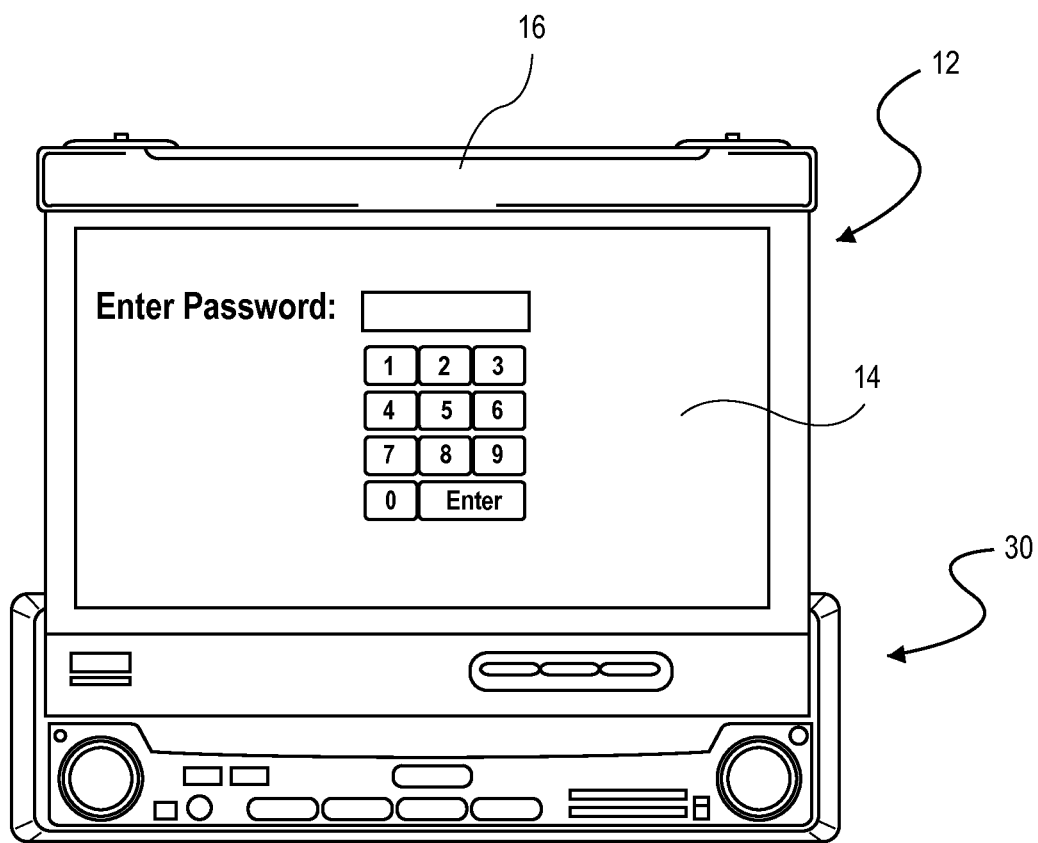
FIG. 3A depicts a portable car audio system implementation of a touchscreen interface having a visual presentation similar to that depicted in the system of FIG. 1.
Figure 3B:
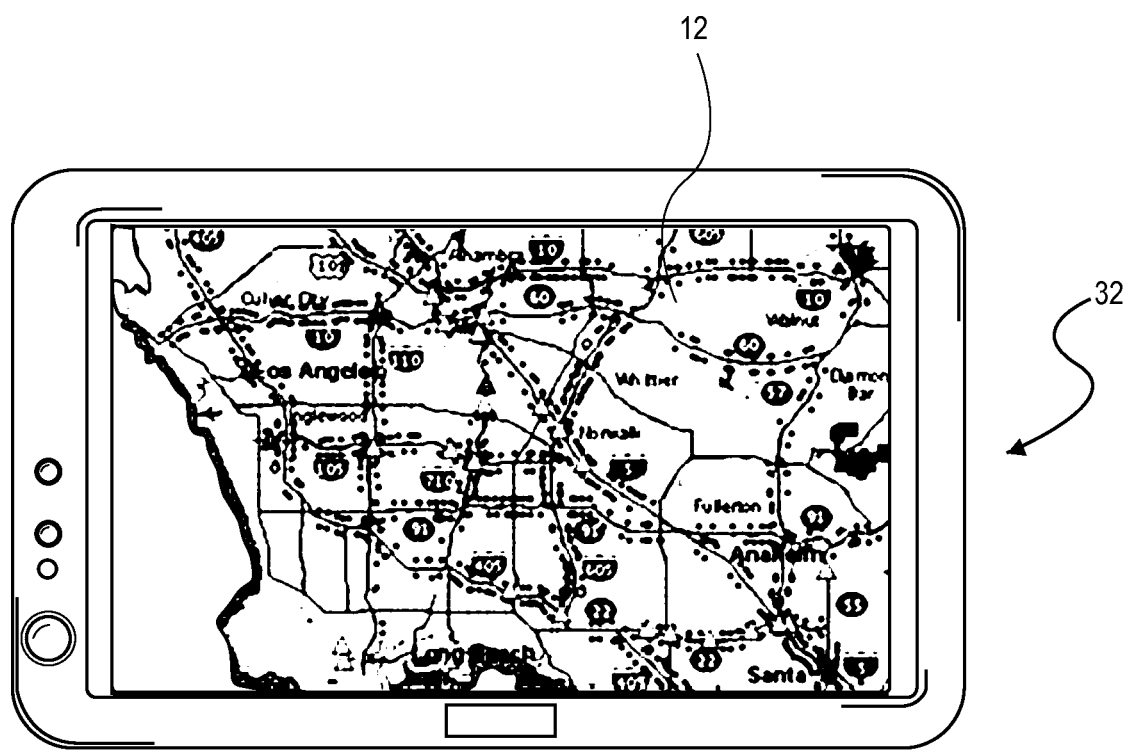
FIG. 3B depicts a handheld global positioning satellite navigation system having a touchscreen implementation.
Figure 3C:
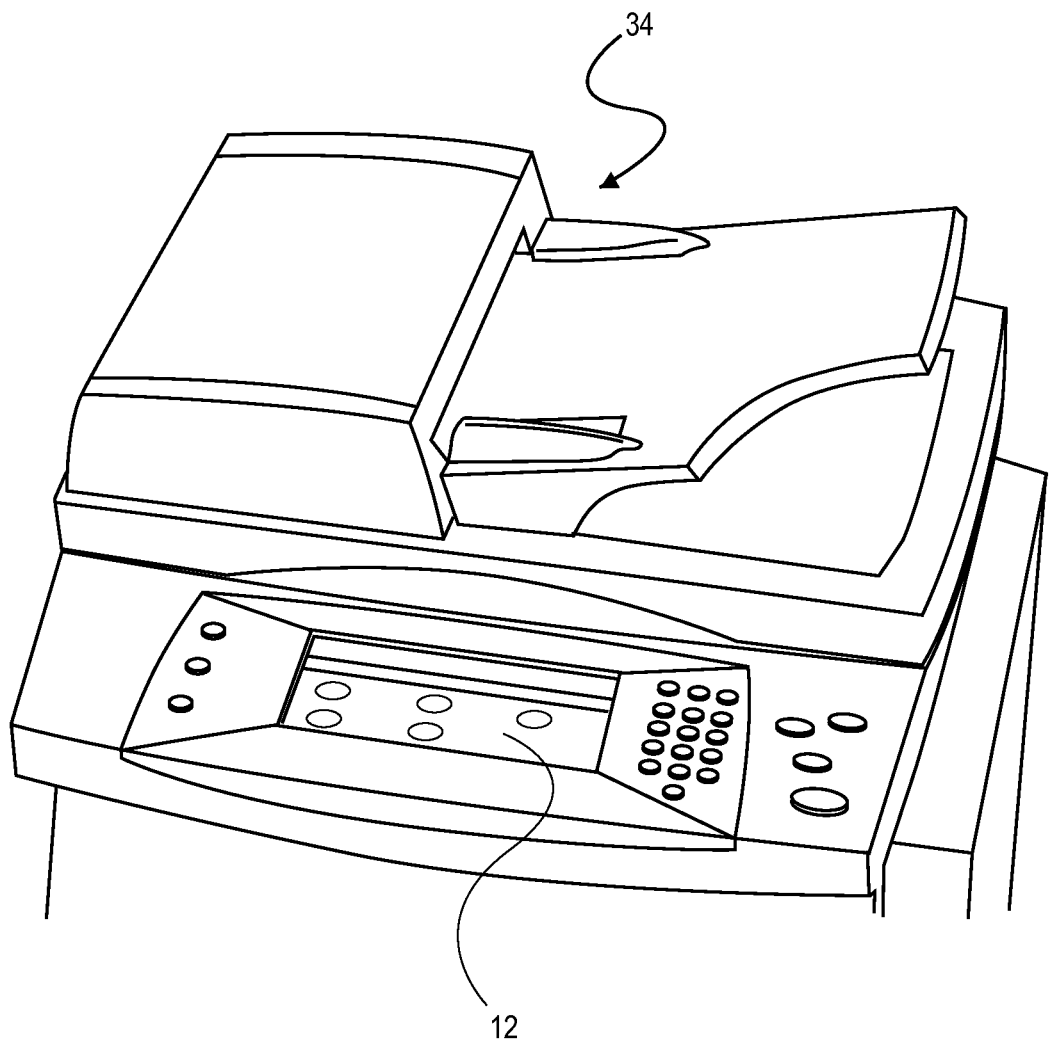
FIG. 3C depicts a copy machine having a touchscreen interface implementation.
Figure 4:
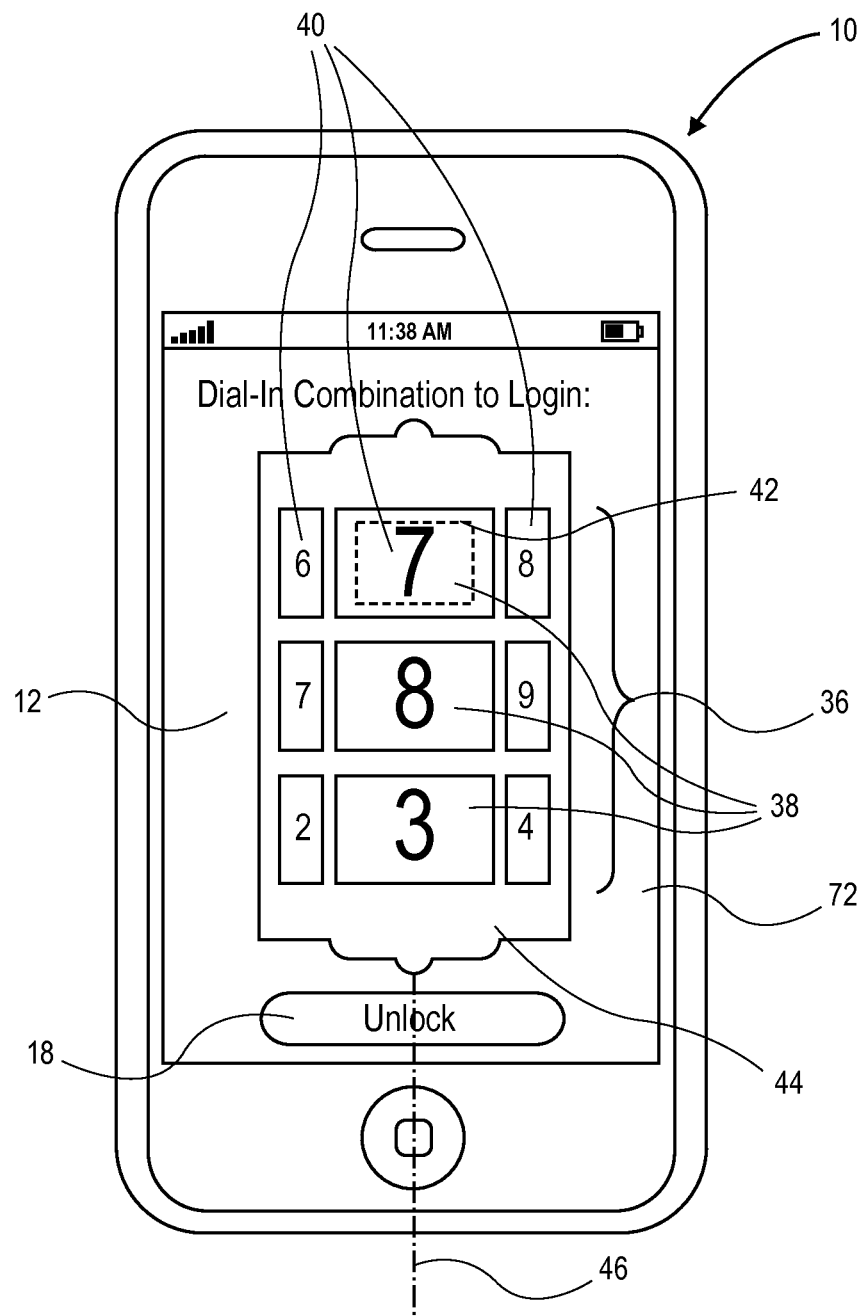
FIG. 4 depicts one embodiment of a mechanical combination lock style touchscreen gateway interface.

Referring to FIG. 4, a handheld mobile communication device such as a personal data assistant, or "PDA" device, (10) is depicted having a touchscreen interface (12). For illustrative purposes, the description below refers to variations of PDA devices (10), but the inventive combination lock interface system and methods described herein are broadly applicable to other devices having touchscreens and security gateways, such as those depicted in FIGS. 1-3C.

Figure 5A:
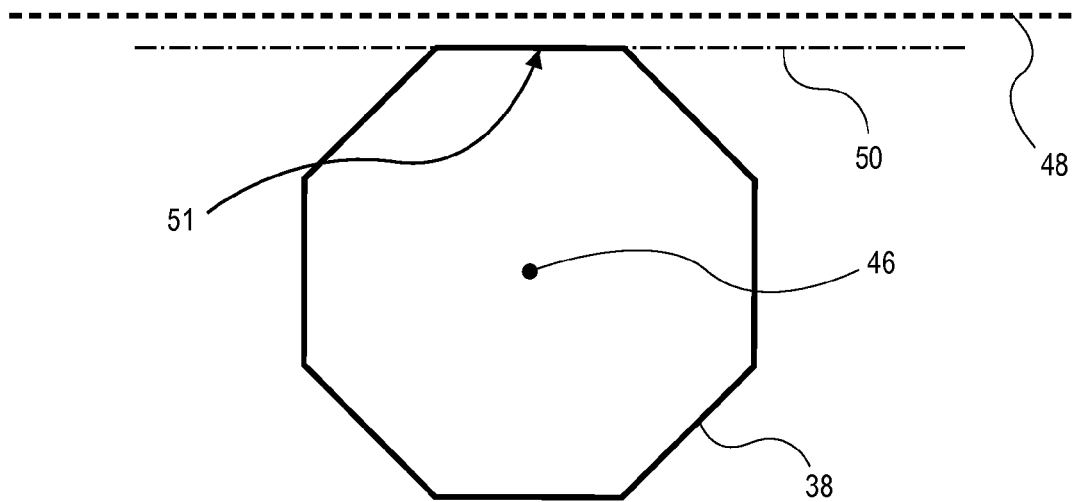
FIGS. 5A and 5B depict schematic illustrations of the rolling action simulated in one embodiment of a mechanical combination lock style touchscreen gateway interface.
Figure 5B:
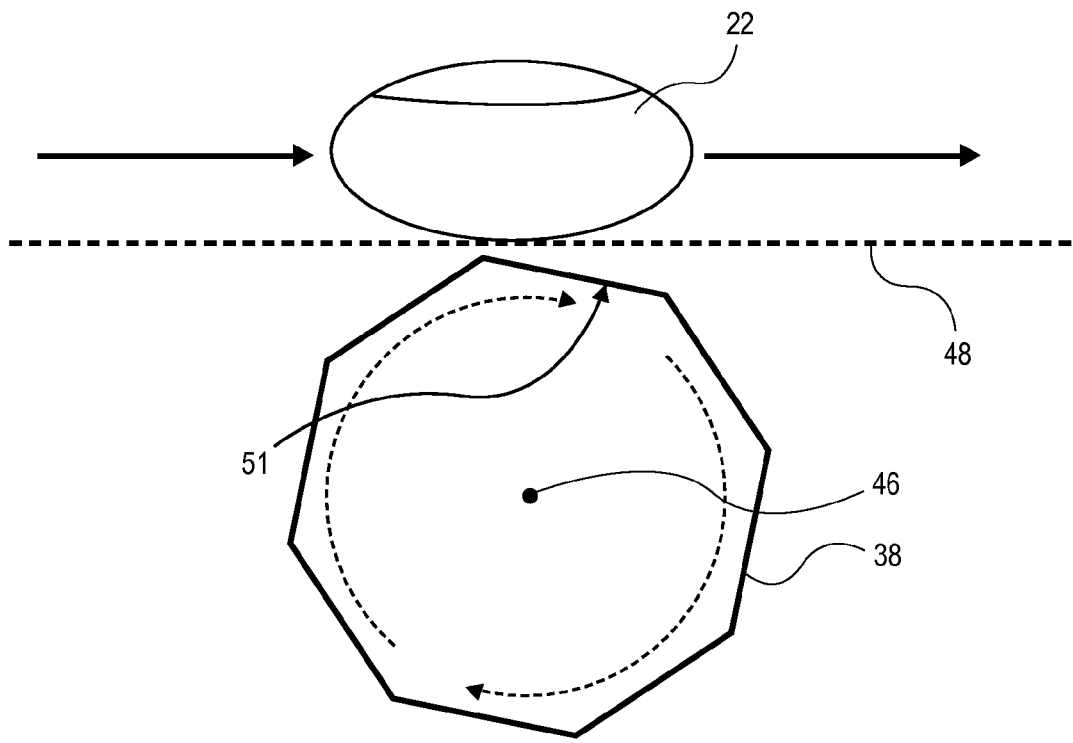

Presented in the user interface depicted in FIG. 4 is an embodiment of a mechanical combination lock simulation to be referred to as a barrel combination lock simulation (36), due to an intentional resemblance between the presented user interface and a side view of an actual physical barrel combination lock, such as those available from suppliers such as OnGuardUSA-Todson, Inc. (for example, the "OnGuard Terrier Combo 4 5061 Combination Cable Lock") to lock bicycles to bicycle racks, wherein at least one rotatable element is rotated about a rotation axis as the user selects a combination to attempt to unlock the physical locking mechanism. Referring to FIG. 4, the depicted barrel combination lock simulation (36) comprises three simulated rotating elements (38) rotatable about a common axis of rotation (46) and housed within a simulated lock housing (44) preferably configured in the user interface to remain substantially fixed relative to the frame (72) of the touchscreen interface (12) and PDA device (10) as the rotatable elements (38) are rotated with physical interaction of the user at the touchscreen. Each of the simulated rotating elements (38) may be rotated independently relative to the lock housing (44) in operation of the user interface, in a manner illustrated in FIGS. 5A and 5B. Referring to FIG. 5A, a single rotating element (38) is shown in side view along with the axis of rotation (46) of such rotating element and an indication of the position of the plane (48) of the touchscreen relative to the rotating element depicted below such touchscreen in the implemented user interface. The rotating element (38) depicted in FIGS. 5A and 5B has approximately 8 selectable positions, each of which approximately occupies a plane which may be aligned with the touchscreen plane (48). For example, in the depicted embodiment, the uppermost depicted position (51) of the rotating element (36) lies in a plane (50) which is substantially perpendicular with the touchscreen plane (48). Referring to FIG. 5B, as a thumb (22), finger, or other instrument (not shown) is moved across the touchscreen plane (48), the simulated barrel lock is configured to roll the rotating element (38) along with the motion of the thumb (22) about the axis of rotation (46), thus taking the uppermost position (51) depicted in FIG. 5A out of planar alignment with the touchscreen plane (48), and rolling the other seven positions about the same axis of rotation (46) as well. Indeed, the simulation in the depicted embodiment is configured to operate as though the operator, with a glancing contact, is rolling an 8-sided nut relative to the screen surface, with each of the eight sides representing a selectable position (40) and a field

(42) in which a character or other variable, such as an alphanumeric symbol, may be displayed. Referring back to FIG. 4, in the depicted embodiment of the barrel combination lock simulation (36), the uppermost of the three depicted rotating elements (38) is depicting a "7" in the position most coplanar with the touchscreen, a "6" in the position to the left, and an "8" to the right. If an imaginary thumb were to engage the depicted touchscreen interface (12) by starting contact near the "6" character and dragging or sliding to the right, in operation, the barrel combination lock simulation would roll to the right, in simulation, the uppermost of the rotating elements (38), thus bringing the position having the field displaying the "6" character into a more coplanar, and more centered (relative to the lock housing (44) and axis of rotation (46) of the rotating elements (38), and rolling the positions displaying the "7" and "8" characters to the right as well (indeed, in the depicted embodiment, as the "6" position approaches the central and coplanar orientation relative to the touchscreen plane, the "8" position would be disappeared by the user interface (36), as though it has rotated around to the back).

Thus, in operation, the depicted barrel lock simulation user interface (36) mimics operation of a physical lock, such as the aforementioned "OnGuard Terrier Combo 4 5061 Combination Cable Lock". It is configured to allow the operator to use touchscreen dragging contacts to roll the rotating elements (38), select a gateway combination (in the embodiment depicted in FIG. 4, the gateway combination "7"-"8"-"3" has been selected), and execute a comparison between the entered gateway combination by selecting a touchscreen button (18) configured to initiate such comparison using a processor (not shown). In another embodiment, not unlike the operation of some actual physical barrel locking mechanisms, the processor is configured to compare each combination made as the interface is operated in real or near-real time, and unlock automatically upon the correct combination being reached. Such embodiment avoids the need for a touchscreen button (18) to execute the comparison, but also potentially facilitates experimental "lock picking".

Several embodiments for "selecting" a given position of a rotating element are desirable. In other words, the processor and user interface preferably are coordinated so that upon execution of a comparison, say by selecting the "unlock" touchscreen button (18) in the embodiment of FIG. 4, the processor captures the correct character or other variable, as described above. In one embodiment, the processor and user interface are configured to deem the character or other variable "selected" that is aligned most closely with the axis of rotation (46) of the rotating element (38). In another embodiment, the processor and user interface are configured to deem the character or other variable "selected" that is aligned most centrally with the geometry of the lock housing (44). In another embodiment, the processor and user interface are configured to deem the character or other variable "selected" that is aligned most coplanar or parallel with the touchscreen plane (48). In another embodiment, the processor and user interface are configured to deem the character or other variable "selected" that is aligned most centrally with a selection alignment indicator, such as an overlaid crosshairs or outline box, an overlaid different shade of user interface color, or the like, as described below in reference to FIG. 10 (element 52). Under any of these embodiments for confirming selection (with the exception of the latter as no selection alignment indicator (52) is depicted in FIG. 4), the selected, or entered, gateway combination for the embodiment depicted in FIG. 4 would be "7"-"8"-"3".

In one embodiment, the device, such as the depicted PDA (10), comprises a speaker or other sound-producing element, and is configured to provide audible feedback to the operator as the user interface is operated. For example, in one embodiment, a simple click sound is created each time a position is rotated into the selection criterium (for example, each time a new position is rotated into a plane parallel to the touchscreen plane, each time a new position is rotated into capture by a selection alignment indicator, each time a new position is rotated across the simulated position below of the axis of rotation of the rotating element, etc). Preferably the audible feedback paradigm is programmable by the user, as with other more conventional audible feedback functionalities of PDAs and other user interface devices. In another embodiment, the device comprises a vibrating mechanism, such as those commonly integrated into cellphones, PDAs, and the like, configured to provide haptic feedback in the form of a quick buzz, a texture indication, or other customizable haptic response, as the user interface is operated. For example, in one embodiment, a barrel lock simulation (36) user interface (12) is configured to provide a low amplitude vibrating texture as a rotating element (38) is rotated, and a higher amplitude haptic click each time a position is rotated into a given selection criterium.

Figure 6:
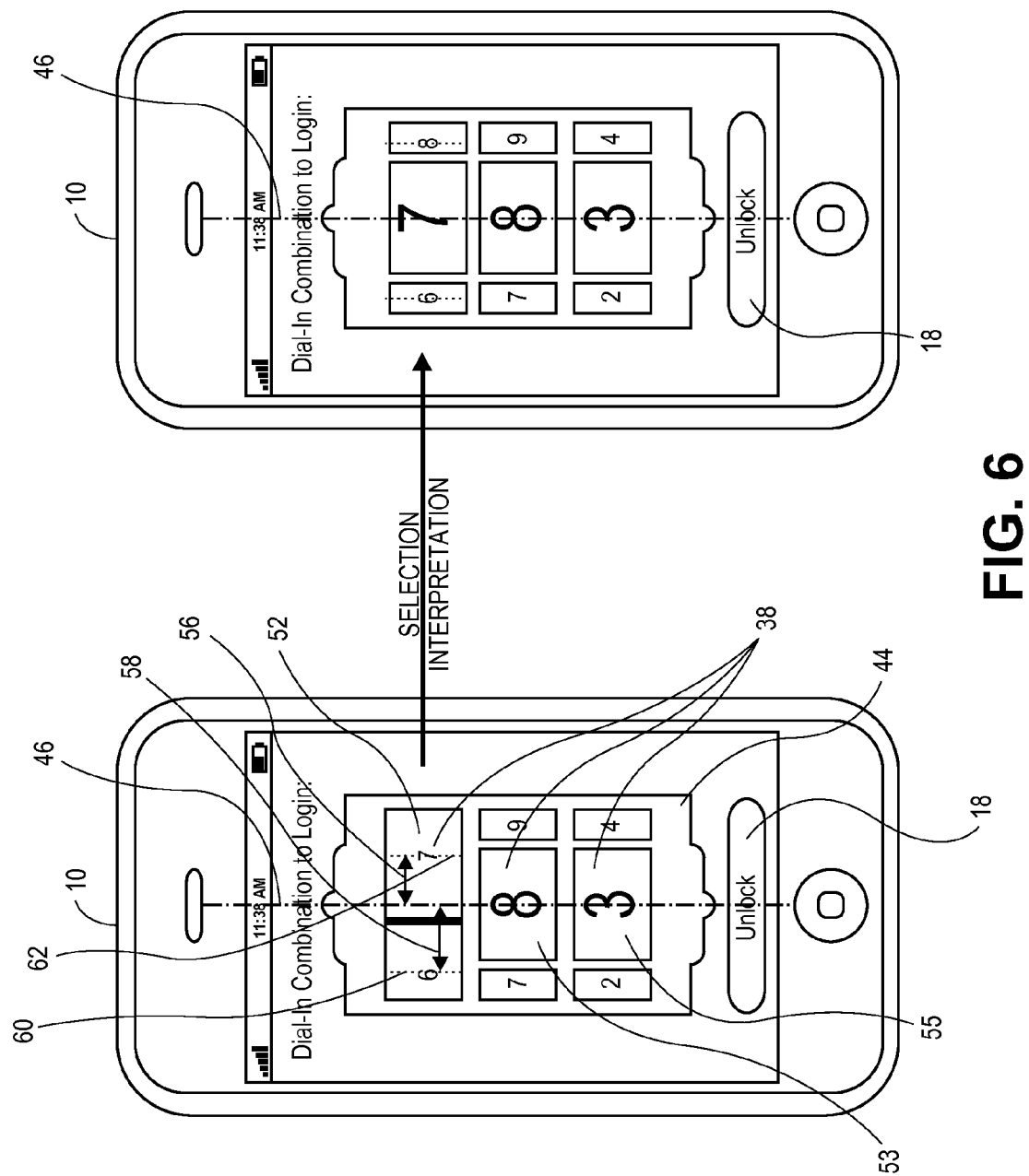
FIG. 6 illustrates an embodiment of a configuration to address incomplete simulated mechanical lock positioning.

In one embodiment the user interface and processor are configured to make a selection for any given rotating element upon election by the operator to execute a comparison, say by operating the "unlock" touchscreen buttons (18) depicted in FIG. 4. Depending upon the selection criteria, as per the discussion above, the system in such embodiment will make the best attempt at "selection" that it can. Referring to FIG. 6, for example, for illustrative purposes, it will be assumed that the selection criterion for this embodiment is: shortest distance between middle of position and projected axis of rotation. As depicted in the left image of FIG. 6, the lowest-positioned (55) of the three rotating elements (38) is selecting a value of "3"; the middle-positioned (53) of the three rotating elements (38) is selecting a value of "8"; and in this embodiment, for the upper-positioned (52) of the three rotating elements (38), the system would compare the distance (58) between the "6" value position midpoint (60) and the projected axis (46) to the distance (56) between the "7" value position midpoint (62) and the projected axis (46), and given the depicted discrepancy, select the "7" value, thus interpreting the user interface configuration as though it has been left positioned as depicted in the right image of FIG. 6—with a selected combination of "7"-"8"-"3".

Figure 7:
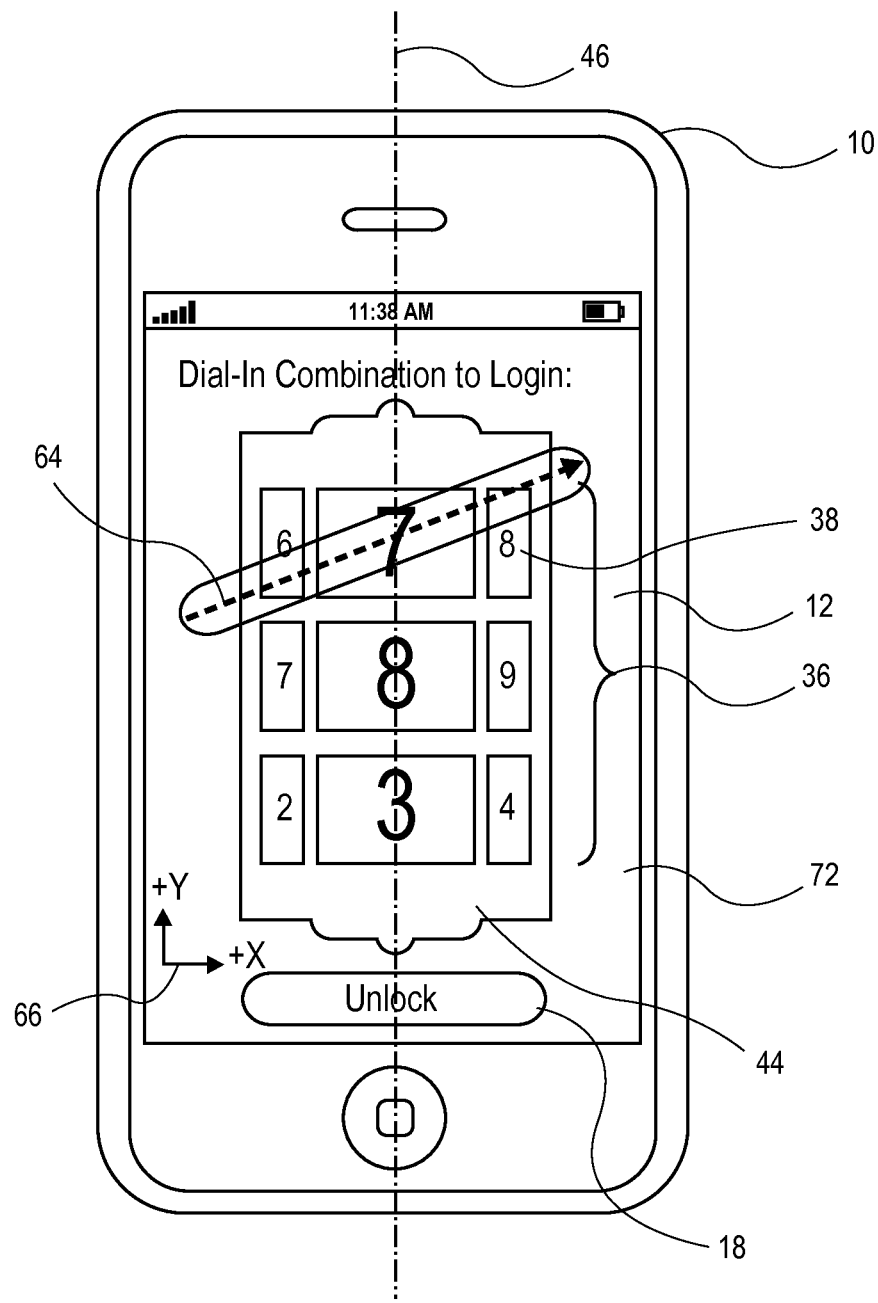
FIG. 7 illustrates an embodiment of a configuration to address interpretation of touch-path vectoring.
Figure 8:
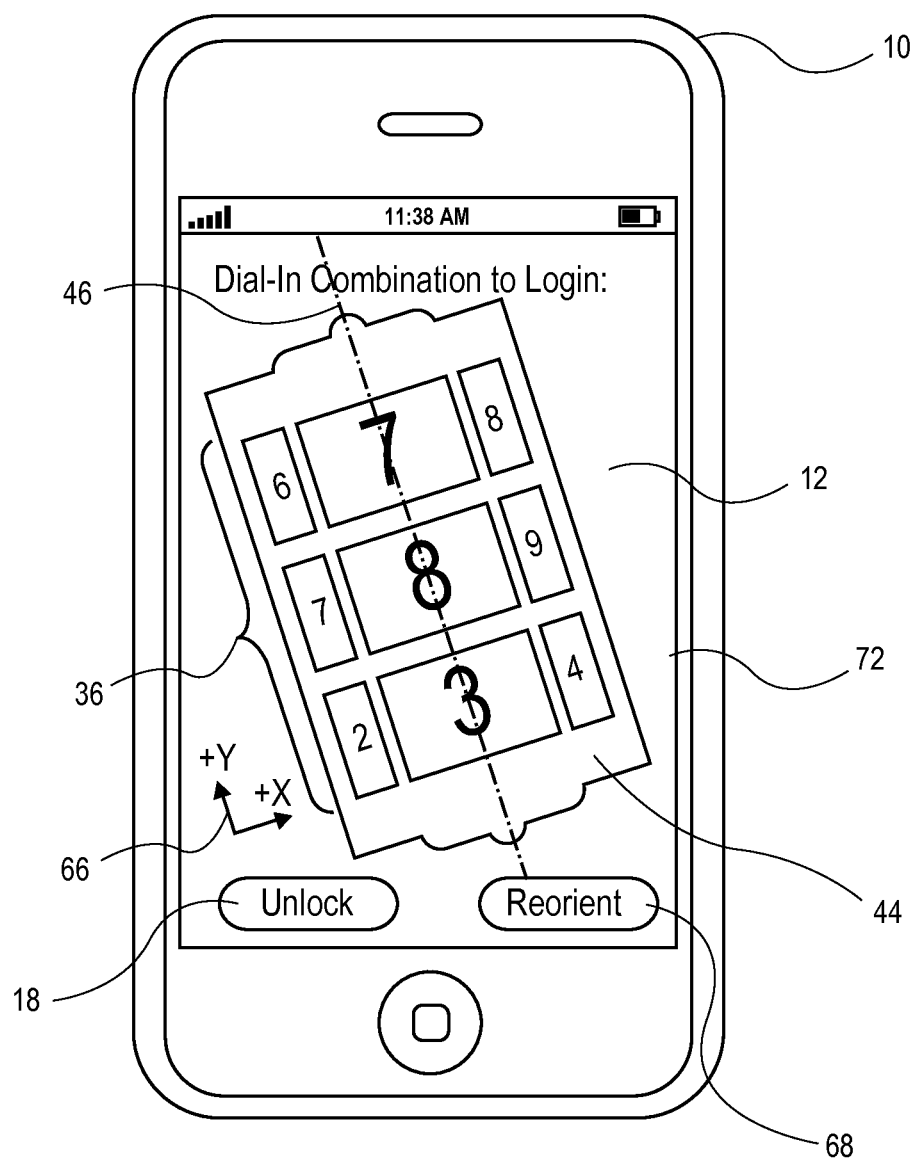
FIG. 8 illustrates an embodiment wherein a mechanical lock simulation may be reoriented by the user.
Figure 9:
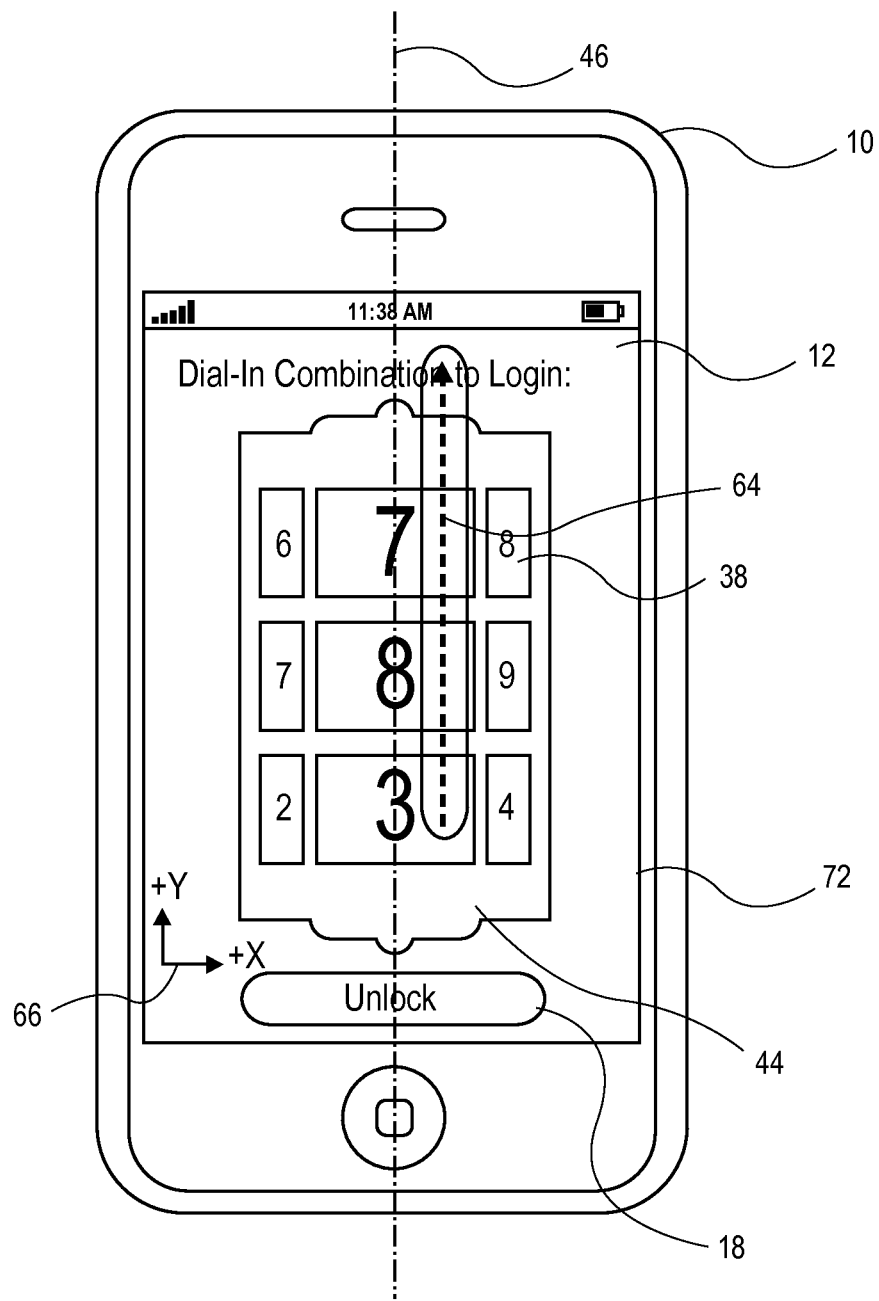
FIG. 9 illustrates an embodiment wherein a vertical axis may be accessed utilizing a substantially vertical touch-path.

In one embodiment, the user interface (12) and processor (not shown) are configured to interpret touchpaths by selectively applying the in-alignment components of a given touchpath. For example, referring to FIG. 7, a barrel lock simulation (36) interface is depicted having three rotating elements (38). The rotating elements (38) and housing (44) are configured in the depicted embodiment to simulate rotation of each rotating element (38) about an axis of rotation (46) substantially aligned with the Cartesian "Y" coordinate axis of the coordinate system (66) of the depicted lock housing (44), by touchscreen manipulation roughly aligned with the Cartesian "X" coordinate axis (plus or minus) of the coordinate system (66) of the depicted lock housing (44). In other words, it would be natural with such a configuration for a user to induce touchpaths that are as close to alignment with the Cartesian "X" coordinate axis (plus or minus) of the coordinate system (66) as possible. A touchpath (64) created by dragging or sliding interaction with the touchscreen (12) is shown imperfectly aligned with either the rotational plane of the uppermost depicted simulated rotating element (38) or the Cartesian "X" coordinate axis (plus or minus) of the coordinate system (66). Notwithstanding this, in one embodiment, such touchpath (64) may be interpreted by applying vector component portion of the touchpath (64) that is parallel to the Cartesian "X" coordinate axis (plus or minus) of the coordinate system (66) as applied to the uppermost of the three rotating elements (38), since the vector component portion of the touchpath (64) that is parallel to the Cartesian "Y" coordinate axis (plus or minus) of the coordinate system (66) generally occupies the user interface area of such uppermost of the three rotating elements (38). To address such misalignments, which may be due to ergonomic or other user or device-based factors, in one embodiment, the combination lock user interface (36) may be reoriented by the operator in a configuration step, such as by selecting a "reorient" touchscreen button (68) allowing for the operator to use the touchscreen to drag and rotate around the combination lock user interface (36) to a new orientation. Referring to FIG. 9, a touchpath (64) is depicted having no vector component aligned with the Cartesian "X" coordinate axis (plus or minus) of the coordinate system (66). In one embodiment, this may be interpreted as a non-rotation of any of the rotatable elements (38). In another embodiment, wherein a barrel combination lock interface combines more than three rotatable elements (38), this touchpath (64) is interpreted as a command to display any rotating elements (38) positioned below the lower-most currently-displayed rotating element (depicted on a "3" position in FIG. 9). In embodiments wherein there are more rotating elements than are displayed, either one ("X" Cartesian or "Y" Cartesian) or both vector components may be utilized. In other words, in one embodiment, a touchpath (64) such as that depicted in FIG. 7 would not only rotate the rotating element stack up, but also to the right; in another embodiment, it would selectably (preferably by an interface control operated by the user) only rotate the stack to the right; in another embodiment, it would only rotate the stack up.

Figure 10:
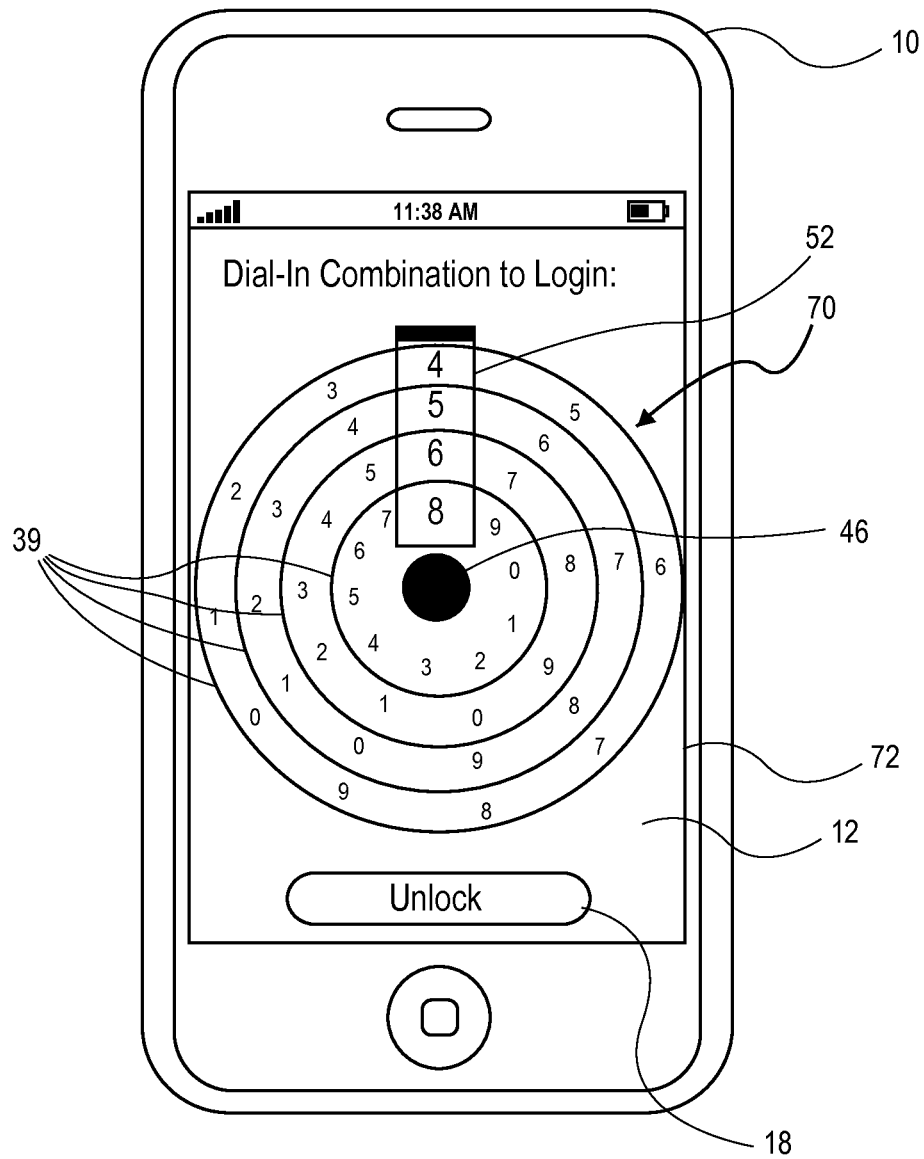
FIG. 10 illustrates an alternative embodiment of a mechanical combination lock style touchscreen gateway interface.

Referring to FIG. 10, an alternative graphical presentation of a mechanical lock having rotating elements is depicted, this embodiment comprising a co-planar concentric ring combination lock simulation (70). In the depicted embodiment, four rotating elements (39) are independently rotatable utilizing touchscreen manipulation in the form of arcuate or other curved touchpaths, straight vectors, etc., and similar notions of selection (in the depicted embodiment, a selection alignment indicator 52 is shown) and rotatable element operation apply as described herein, the difference in this embodiment being that the rotating elements (39) rotate in a plane substantially parallel with the plane of the touchscreen, about an axis of rotation (46) substantially perpendicular to the plane of the touchscreen.

Preferably some or several aspects of a combination lock interface are programmable by an operator or user. Referring to the embodiments described in reference to FIGS. 4-9, for illustrative purposes, each of the depicted simulated rotating elements (38) operated as an 8-sided rotatable member having eight positions, each position defining a field which may be occupied by an item, variable, or value such as the number "7". In one embodiment, each of the positions may be selectably configured to display in its field numbers, letters, words, phrases, icons, shapes, pictures, colors, patterns, or combinations thereof. By "selectably", it is meant that in a programming or configuration mode, the system is configured such that operator may not only configure what types of items, variables, and/or values may occupy such fields, but also which particular ones should be coded onto the fields of the particular rotatable members. In another embodiment, in a programming or configuration mode, the system is configured such that operator may configure the number of positions on each rotating element. Indeed, the cross-sectional shape may be selectably configured (for example, from a polygon to a smooth arcuate surface, such as a cylindrical surface) in one embodiment to adjust the user interface presentation. Thus in one embodiment having all of these programmable functionalities, an operator or user may program the number of rotating elements, how many positions occupy each rotating element, what types of items, variables, and/or values may occupy the fields of the positions, and what particular items, variables, and/or values will occupy what particular rotating elements. Further, in one embodiment, the operator or user may utilize the mechanical lock simulation user interface to enter a passkey combination to be utilized in future comparisons.

Figure 11A:
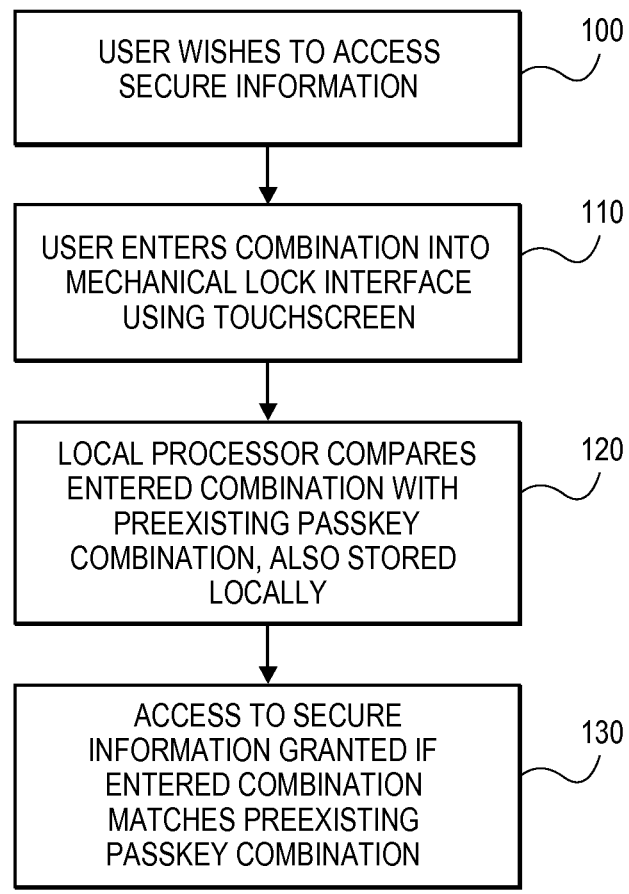
FIG. 11A illustrates a local processing embodiment.

In operation, the inventive combination lock user interface provides a highly programmable means for presenting and traversing a gateway that is well suited for touchscreen devices wherein simple motor skills movements, in many cases with one hand, are desirable, such as with cellphones, PDAs, and other handheld devices, in addition to other touchscreen-interface devices, such as car audio equipment, office equipment, and the like. Regardless of the hardware configuration, a touchscreen, processor, and storage device are preferred to execute a gateway transaction. In one embodiment, all of these elements reside locally (not connected by remote network), preferably on the same device. Referring to FIG. 11A, operation of such an embodiment is illustrated. A user or operator who wishes to cross a security gateway (100) enters a combination in to the simulated mechanical lock interface using the touchscreen (110), and a local processor, preferably residing on the same hardware device, compares the entered combination with a preexisting (and preferably pre-programmed by the user or operator in a programming or configuration mode) passkey combination, which preferably is also stored upon a local storage device (120). Access past the gateway is granted if the entered combination is deemed to match the passkey combination by the processor (130).

Figure 11B:
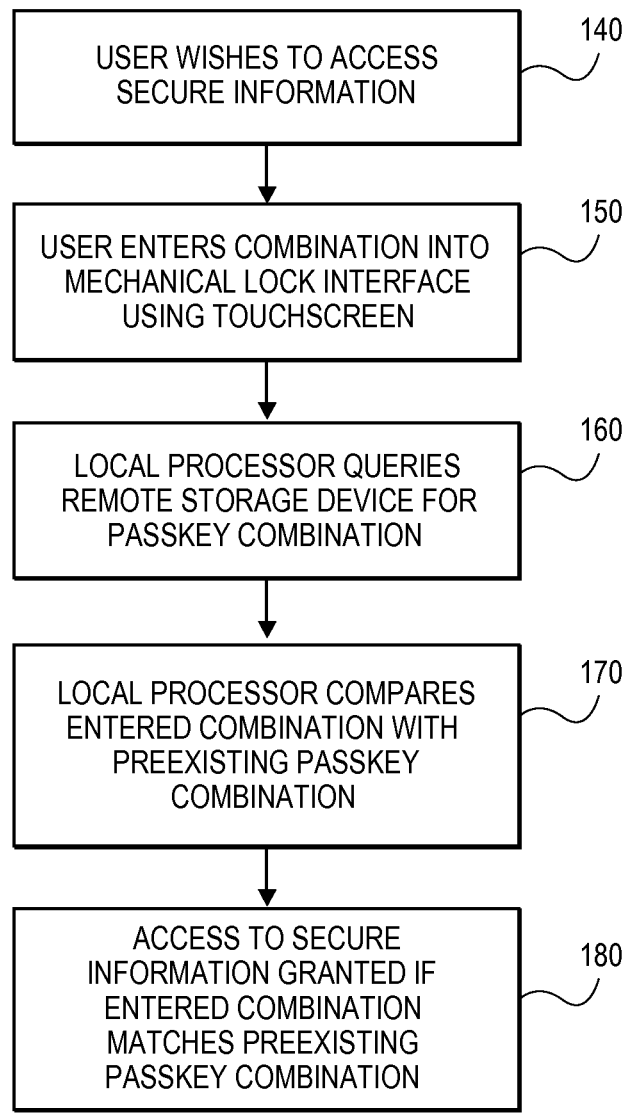
FIG. 11B illustrates an embodiment configured to utilize local processing with a remote data query.

In another embodiment, as depicted in FIG. 11B, a user or operator who wishes to cross a security gateway (140) enters a combination in to the simulated mechanical lock interface using the touchscreen (150), and a local processor queries a remote storage device containing the passkey combination (preexisting and preferably pre-programmed by the user or operator in a programming or configuration mode) (160). Given the results of the query, the local processor compares the entered combination with the passkey combination (170) and, based upon the comparison analysis, provides access past the gateway if a match is determined (180).

Figure 11C:
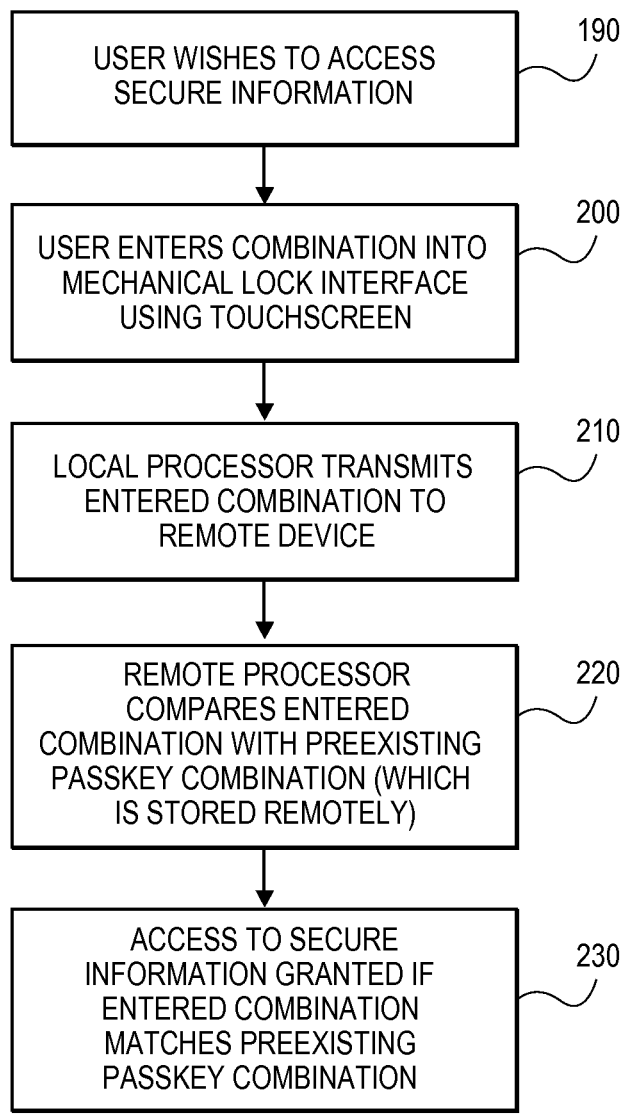
FIG. 11C illustrates an embodiment configured to utilize remote processing subsequent to local capture of an entered combination.

In another embodiment, as depicted in FIG. 11C, a user or operator who wishes to cross a security gateway (190) enters a combination in to the simulated mechanical lock interface using the touchscreen (200), and a local processor transmits the entered combination to the remote device (210) for comparison analysis with a preexisting (and preferably pre-programmed by the user or operator in a programming or configuration mode) passkey combination which is stored remotely (220). Access past the gateway is provided if the remote processing determines that the entered combination matches the preexisting passkey combination (230).

Figure 12A:
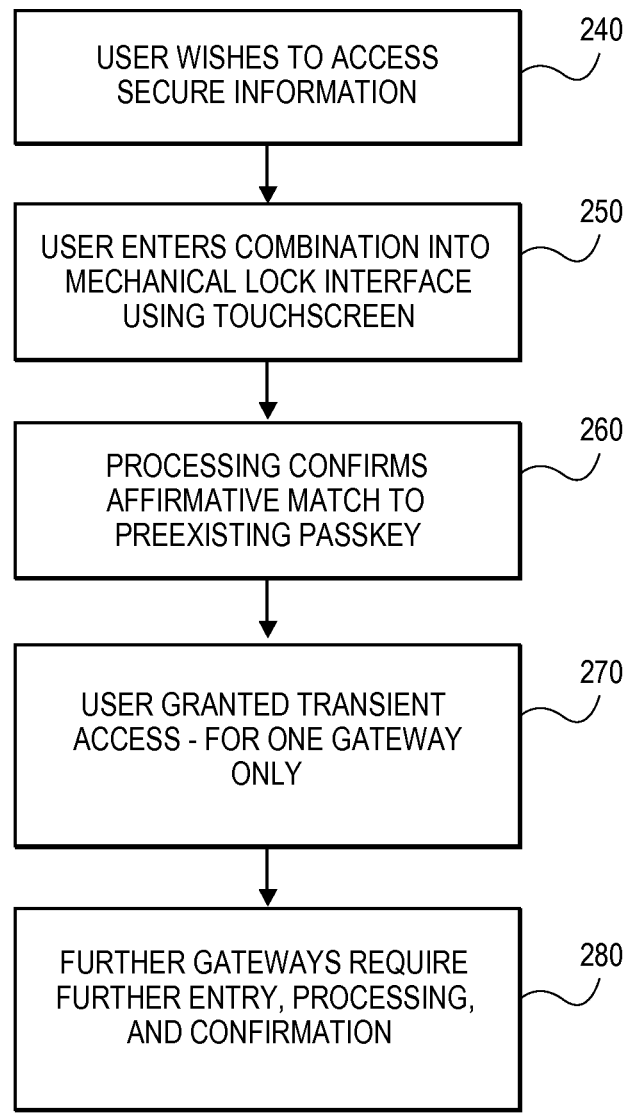
FIG. 12A illustrates a single session gateway access embodiment.
Figure 12B:
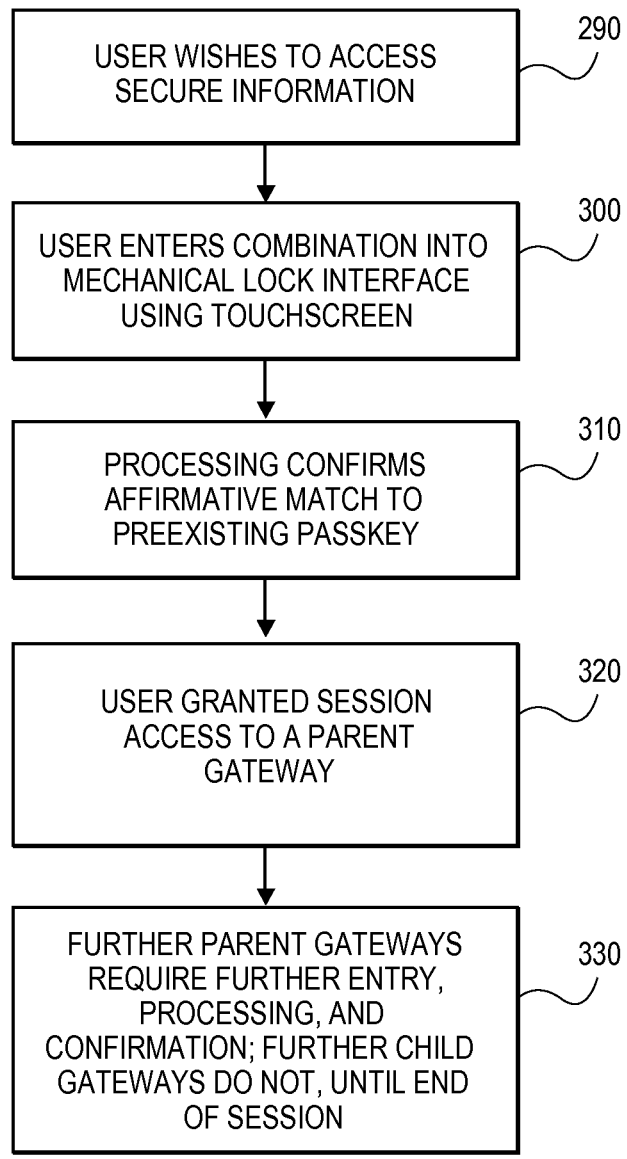
FIG. 12B illustrates a multi-session gateway access embodiment.

In one embodiment, the system is configured to interpret a passed gateway as a transient, single time event, which in another embodiment, access past a parent gateway allows access past all related children gateways. Referring to FIG. 12A, a single-session or single-gateway access paradigm is illustrated, wherein a user wanting access past a gateway (240) enters a combination into the mechanical lock touchscreen interface (250), and subsequent to pertinent processing confirming a match to a preexisting passkey (260), one single gateway is passed (270), but further gateways require further (and preferably different) combinations (280). Alternative, referring to FIG. 12B, a multi-session or multi-gateway access paradigm is illustrated, wherein a user wanting access past a gateway (290) enters a combination into the mechanical lock touchscreen interface (300), and subsequent to pertinent processing confirming a match to a preexisting passkey (310), a parent gateway is traversed (320), subsequent to which further parent gateways require further (and preferably different) combinations, but further child gateways subordinate in security level to the pertinent passed parent do not, until the end of the session by voluntary or involuntary (in the event of a session timeout, for example) means (330).

While multiple embodiments and variations of the many aspects of the invention have been disclosed and described herein, such disclosure is provided for purposes of illustration only. For example, wherein methods and steps described above indicate certain events occurring in certain order, those of ordinary skill in the art having the benefit of this disclosure would recognize that the ordering of certain steps may be modified and that such modifications are in accordance with the variations of this invention. Additionally, certain of the steps may be performed concurrently in a parallel process when possible, as well as performed sequentially. Accordingly, embodiments are intended to exemplify alternatives, modifications, and equivalents that may fall within the scope of the claims.

The invention claimed is:

1. A data security gateway system of a mobile communication device, comprising:
   a user interface displayable on a touchscreen of the mobile communication device;
   a processor; and
   a storage device;
   the processor being configured to
      receive first touchscreen input from a user of the mobile communication device to select or program at least one of a quantity and a geometry of simulated rotating elements of the mechanical combination lock simulation, each simulated rotating element having one or more selectable positions spaced apart about a geometry of the rotating element,
      generate a user interface displayed in a first orientation and comprising the mechanical combination lock simulation based at least in part upon the at least one selected or programmed quantity and geometry of simulated rotating elements,
      receive second touchscreen input from the user,
      reorient the mechanical combination lock simulation as displayed on the touchscreen from the first orientation to a different, second orientation in response to the second touchscreen input such that the mechanical combination lock simulation is displayed on the touchscreen in the second orientation as skewed relative to a body of the mobile communication device, the user interface being displayable to and operable by the user in the first and second orientations by engaging the touchscreen to manipulate the user interface and enter a gateway combination comprising respective data of respective simulated rotating elements, and
      compare the entered gateway combination data with at least one value stored upon the storage device and determine whether access to grant access to further information based at least in part upon the comparison.

2. The system of claim 1, the processor being configured to reorient the mechanical combination lock simulation such that the mechanical combination lock simulation is displayed on the touchscreen as skewed relative to an axis about which the one or more simulated rotating elements initially rotated in the first orientation.

3. The system of claim 1, the processor being configured to reorient the mechanical combination lock simulation based at least in part upon the second touchscreen input at a first touchscreen location that differs from a second touchscreen location of the mechanical combination lock simulation.

4. The system of claim 1, the processor being configured to reorient the mechanical combination lock simulation based at least in part upon the second touchscreen input comprising the user selecting a touchscreen button requesting reorientation of the mechanical lock simulation.

5. The system of claim 1, the processor being configured to reorient the mechanical combination lock simulation based at least in part upon the second touchscreen input comprising the user dragging and rotating the mechanical lock simulation to the second orientation.

6. The system of claim 5, the processor being configured to reorient the mechanical combination lock simulation based at least in part upon the second touchscreen input comprising the user selecting a touchscreen button requesting reorientation of the mechanical lock simulation and then dragging and rotating the mechanical lock simulation to the second orientation.

7. The system of claim 1, each simulated rotating element being operable as a multi-sided rotatable member having respective positions.

8. The system of claim 1, the first touchscreen input being utilized to select or program a cross-sectional shape of a simulated rotating element.

9. The system of claim 1, the first touchscreen input being utilized to select or program the quantity of simulated rotating elements.

10. The system of claim 1, wherein the touchscreen and the processor are integrated within a handheld mobile communication device.

11. The system of claim 1, the touchscreen being operable by the user sliding a thumb across the touchscreen while holding the mobile communication device in a palm of a single hand to manipulate the user interface and enter the gateway combination.

12. The system of claim 11, the second orientation addressing an ergonomic factor when holding the mobile communication device with the single hand.

13. A data security gateway system of a mobile communication device, comprising:
   a user interface displayable on a touchscreen of the mobile communication device;
   a processor; and
   a storage device;
   the processor being configured to
      receive first touchscreen input from a user of the mobile communication device to select or program:
         a quantity of simulated rotating elements of the mechanical combination lock simulation, and
         a geometry of simulated rotating elements of the mechanical combination lock simulation, each simulated rotating element having one or more selectable positions spaced apart about a geometry of the rotating element, generate a user interface displayed in a first orientation and comprising the mechanical combination lock simulation based at least in part upon the at least one selected or programmed quantity and geometry of simulated rotating elements, receive second touchscreen input from the user and reorient the mechanical combination lock simulation as displayed on the touchscreen from the first orientation to a different, second orientation in response to the second touchscreen input such that the mechanical combination lock simulation is displayed on the touchscreen in the second orientation as skewed relative to a body of the mobile communication device, the user interface being displayable to and operable by the user in the first and second orientations by engaging the touchscreen to manipulate the user interface and enter a gateway combination comprising respective data of respective simulated rotating elements, and compare the entered gateway combination data with at least one value stored upon the storage device and determine whether access to grant access to further information based at least in part upon the comparison.

14. The system of claim 13, the processor being further configured to receive user input utilized to further select or program which types of items, variables or values will occupy fields defined by respective positions of the simulated rotating elements.

15. The system of claim 13, the processor being further configured to receive user input utilized to select or program a cross-sectional shape of a simulated rotating element is user programmable.

16. The system of claim 15, the cross-sectional shape being selected from cross-sectional shapes varying from a polygon to a smooth arcuate surface.

17. The system of claim 13, each simulated rotating element being operable as a multi-sided rotatable member having respective positions defining respective fields.

18. The system of claim 17, the processor being further configured to receive user input utilized to select or program a number of positions.

19. The system of claim 17, the processor being further configured to receive user input utilized to select or program a type of item, variable or value that occupies respective fields.

20. The system of claim 19, the processor being further configured to receive user input utilized to select or program which particular item, variable or value is to be coded onto a field of a particular rotatable member.

21. The system of claim 13, the user interface being operable by the user to enter a gateway combination data for use in a future comparison to determine whether to grant access to further information in the future.

22. The system of claim 13, wherein the touchscreen and the processor are integrated within a handheld mobile communication device.

23. The system of claim 22, the touchscreen being operable by the user sliding a thumb across the touchscreen while holding the mobile communication device in a palm of a single hand to manipulate the user interface and enter the gateway combination.

24. A data security gateway system of a mobile communication device, comprising:

a user interface displayable on a touchscreen of the mobile communication device;

a processor; and a storage device;

the processor being configured to receive first touchscreen input from the user of the mobile communication device to select or program at least one of a quantity and a geometry of simulated rotating elements of the mechanical combination lock simulation, each simulated rotating element having one or more selectable positions spaced apart about a geometry of the rotating element, generate a user interface displayed in a first orientation and comprising the mechanical combination lock simulation based at least in part upon the at least one selected or programmed quantity and geometry of simulated rotating elements, the user interface being operable by the user engaging the touchscreen to further manipulate the user interface and enter a first portion of the gateway combination comprising data of at least one currently displayed simulated rotating element;

receive second touchscreen input from the user comprising a dragging or sliding action upon the touchscreen along at least a portion of the displayed mechanical lock simulation;

interpret a touchpath resulting from the dragging or sliding action;

display at least one additional rotating element that was not initially displayed in response to the dragging or sliding action by the user upon the touchscreen, the user interface being operable by the user engaging the touchscreen to further manipulate the user interface and enter a second portion of the gateway combination comprising data of at least one simulated rotating element that was not initially displayed, receive third touchscreen input from the user and reorient the mechanical combination lock simulation as displayed on the touchscreen from the first orientation to a different, second orientation in response to the third touchscreen input such that the mechanical combination lock simulation is displayed on the touchscreen in the second orientation as skewed relative to a body of the mobile communication device, the mechanical combination lock simulation being displayed in the second orientation during entry of at least one of the first and second portions of the gateway combination data, and compare the entered gateway combination data comprising the first and second portions with at least one value stored upon the storage device and determine whether access to grant access to further information based at least in part upon the comparison.

25. The system of claim 24, the first touchscreen input being utilized to select or program the quantity and the geometry of the simulated rotating elements.

* * * * *